United States Patent [19]

Trail

[11] 4,181,612
[45] Jan. 1, 1980

[54] APPARATUS FOR SERVICING A BIRD CAGE

[76] Inventor: Lloyd G. Trail, 1883 Bay St., Port Orchard, Wash. 98366

[21] Appl. No.: 920,382

[22] Filed: Jun. 29, 1978

[51] Int. Cl.² ............................................. B01D 23/16
[52] U.S. Cl. ........................................ 210/169; 119/5; 119/23; 210/195.1; 210/196; 210/197; 210/263; 210/416 S
[58] Field of Search ................. 210/169, 194, 195 R, 210/196, 197, 416 R, 416 AS, 263, 265, 65; 119/16, 22, 28, 23, 5

[56] References Cited

U.S. PATENT DOCUMENTS

| | | | |
|---|---|---|---|
| 3,718,119 | 2/1973 | Stevenson | 119/28 |
| 3,982,499 | 9/1976 | Frankl | 119/28 |
| 3,983,843 | 10/1976 | Johnson | 210/169 |
| 4,002,566 | 1/1977 | Smith | 210/169 |

Primary Examiner—Frank Sever

[57] ABSTRACT

The apparatus and technique service the cage in the sense of removing the waste material generated in the cage by the bird's occupancy of the same. The apparatus and technique employ a bed of particle matter to filter elements of the waste material from a liquid in which the waste material was previously collected and entrained to remove it from the cage. The filtered effluent is then returned to the cage to collect and entrain new waste material before it is refiltered in turn in a closed cycle. In one embodiment, the container for the bed of particle matter is adapted to display aquatic life, and the volume of liquid which is cycled through the foregoing steps is adjusted to form a pool of liquid above the bed so that the aquatic life can live in the pool. Meanwhile, the pool liquid is also cycled through the foregoing steps as part of the waste removal liquid used in the cage.

7 Claims, 6 Drawing Figures

APPARATUS FOR SERVICING A BIRD CAGE

THE INVENTION IN GENERAL

When they are domesticated, birds are commonly kept in cages and part of the task of maintaining and servicing each bird is to clean his cage from time to time, to remove the food, feathers, offal and other waste material which is generated in the cage by the bird's occupancy of it. The waste material may be removed mechanically such as by providing a removable mat on the bottom of the cage with which to collect the material; but this requires frequent attention to the task of removing, cleaning and replacing the mat before it becomes malodorous or unsightly. Or the waste material may be removed hydraulically such as by flushing it from the bottom of the cage; but this requires plumbing with which to accomplish the task, and the plumbing in turn must include both a fresh water source and a drain system with which to eliminate the waste entraining water. Both are seldom available in a household living room or at most other household sites where birds are commonly displayed. In any event, both of the foregoing procedures are tiresome to continue indefinitely and present apparatus and techniques for automating them lie beyond the financial means of most bird collectors, particularly if the collector wishes to display a multitude of birds, either in an aviary or in separate cages, each of which must be separately serviced as indicated.

The present invention provides a relatively inexpensive, self-operating apparatus and technique for removing the waste material which is generated by a bird or birds occupying a cage. The apparatus and technique are hydraulic in nature, but they do not require associated plumbing for their operation, in that the hydraulic medium is recirculated within a closed system. Thus, the invention may be put to use even in those circumstances where plumbing is unavailable, such as in the living room of a home or in some area of a pet store where there is no plumbing.

The inventive apparatus and technique are particularly useful in those circumstances where birds and aquatic life are displayed together. For example, many people who collect and display tropical fish, often wish to simulate a tropical setting for the fish by displaying birds in company with them. They may also wish to suggest a tropical environment for the fish and birds by displaying them in the midst of tropical plant life. The inventive apparatus and technique have the advantage that they lend themselves to the display of birds in conjunction with aquatic life, with or without surrounding plant life.

Other advantages will become apparent as the apparatus and technique are described more fully hereinafter.

In general, the inventive technique comprises collecting and entraining a portion of the waste material in a liquid, circulating the waste entraining liquid through a bed of particle matter which is adapted to pass the liquid therethrough while filtering elements of the waste material therefrom, to generate a filtered effluent, and then collecting and entraining a new portion of the waste material in the filtered effluent and refiltering the same in a closed cycle. The waste material is commonly collected and entrained in the liquid by flushing the bottom of the cage with the same, as for example, by spraying the bottom of the cage with the liquid. Also, the liquid is commonly circulated through the bed of particle matter by inducing it to flow between inlet and outlet points on relatively opposite sides thereof, as for example, by inducing it to flow between points adjacent the top and bottom thereof, or between points adjacent opposing lateral sides thereof. Furthermore, the liquid is commonly induced to flow between such points by a pump such as a suction pump which is interposed between the outlet point and the point at which the liquid is sprayed over the bottom of the cage. For example, in one embodiment of the invention, the cage is disposed above the bed, the spray liquid is allowed to collect on the upper surface of the bed by gravity, and the filtered effluent is withdrawn at a point below said surface by the pump and thence lifted by the pump to the point at which it is sprayed over the bottom of the cage. In another embodiment, the spray liquid is allowed to collect at a point on one lateral side of the bed and the filtered effluent is withdrawn by the pump at a point on the opposite lateral side thereof and thence lifted by the pump to the point at which it is sprayed over the bottom of the cage.

The latter technique lends itself to the use of the invention for servicing both birds and aquatic life such as fish. For example, in one version of the latter technique, the bed of particle matter is held in a container which is adapted to display aquatic life such as domestic fish, and the waste entraining liquid which is cycled through the foregoing steps is adapted in volume to form a pool of liquid in the container which submerges the bed to a level raised sufficiently above the upper surface of the bed to form an inhabitable body of water for the aquatic life therebetween. Of course, the pump operates to circulate the body of water in the pool through the bed of particle matter, as well as to circulate the liquid sprayed over the bottom of the cage through the same.

The waste entraining liquid from the cage is commonly screened before it is circulated through the bed of particle matter in all embodiments of the technique.

The inventive apparatus comprises means for collecting and entraining a portion of the waste material in a liquid, a filter unit comprising a bed of particle matter adapted to pass the liquid therethrough while filtering elements of the waste material therefrom, means for circulating the waste entraining liquid through the filter unit to generate a filtered effluent, and means for collecting and entraining a new portion of the waste material in the filtered effluent and refiltering the same in a closed cycle. The means for collecting and entraining the waste material in the liquid commonly comprise means for flushing the bottom of the cage with the liquid, as for example, where the flush means is operative to spray the bottom of the cage with the liquid. The means for circulating the waste entraining liquid through the filter unit commonly include means for inducing the liquid to flow between inlet and outlet points on relatively opposite sides of the bed of particle matter, as for example, where a pump such as a suction pump is interposed between the outlet point and the point at which the liquid is sprayed over the bottom of the cage. In one embodiment of the apparatus, for example, the cage is disposed above the bed, there are means whereby the spray liquid is allowed to collect on the upper surface of the bed by gravity, and the pump is operative to withdraw the filtered effluent at a point below said surface and thence to lift the effluent to the point at which it is sprayed over the bottom of the cage.

In another embodiment, there are means whereby the liquid is allowed to collect by gravity at a point on one lateral side of the bed, and the pump is operable to withdraw the filtered effluent at a point on the opposite lateral side thereof and thence to lift the effluent to the point at which it is sprayed over the bottom of the cage.

The latter embodiment of the apparatus may be used to service both birds and aquatic life such as fish, and in such a case, it further comprises a container which is adapted to display the aquatic life and holds the bed of particle matter therein. The liquid in the apparatus is adjusted in volume to form a pool of liquid in the container which submerges the bed to a level raised sufficiently above the upper surface of the bed to form an inhabitable body of liquid for the aquatic life therebetween. The pump operates to circulate the body of liquid in the pool through the bed of particle matter, as well as to circulate the liquid sprayed over the bottom of the cage through the same.

In all embodiments, the apparatus commonly also comprises means for screening the waste entraining liquid from the cage before it is circulated through the filter unit.

BRIEF DESCRIPTION OF THE DRAWINGS

These features will be better understood by reference to the accompanying drawings which illustrate two embodiments of the invention, in one of which the apparatus and technique are employed to service one or more birds in a cage, and in the other of which the apparatus and technique are employed to service both birds and aquatic life such as domestic fish.

In the drawings.

DESCRIPTION OF THE PREFERRED EMBODIMENTS

Figure 1:
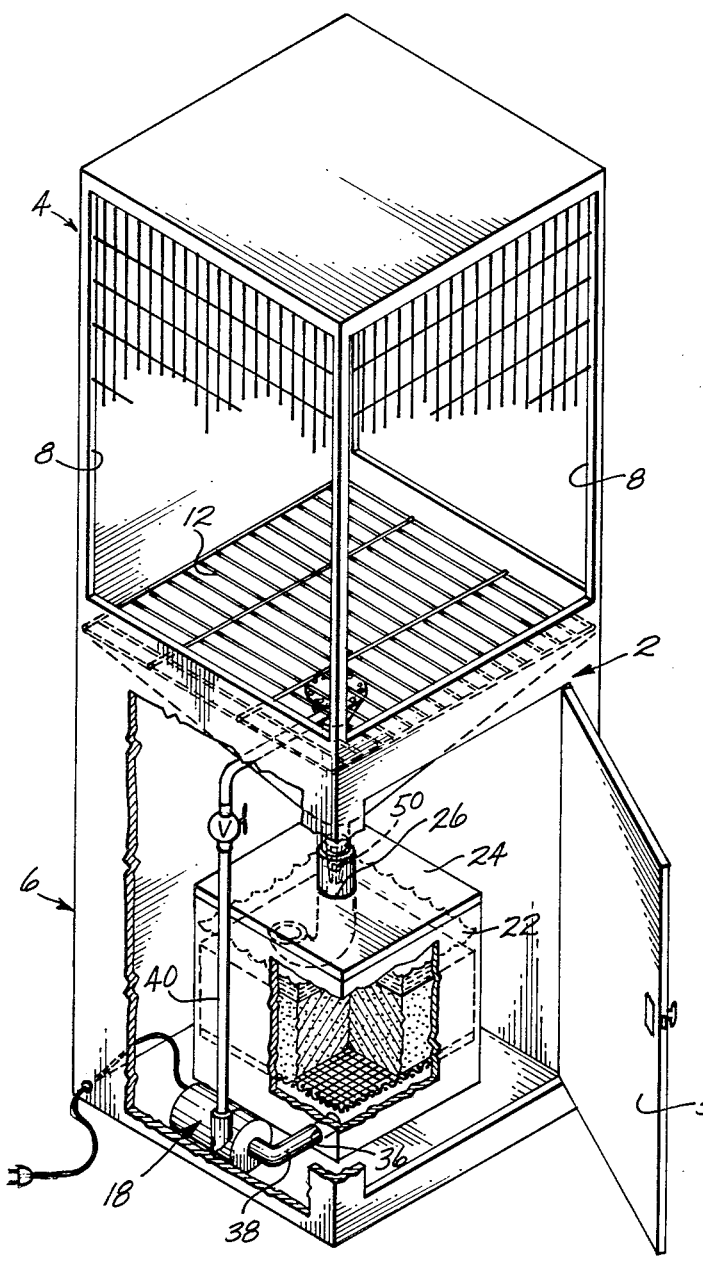
FIG. 1 is a perspective view of the first mentioned apparatus.
Figure 2:
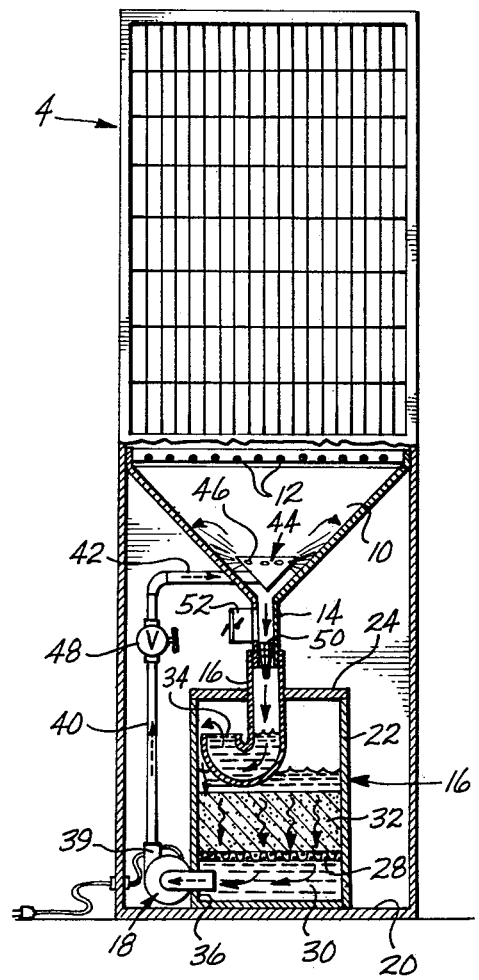
FIG. 2 is a part cross sectional side elevational view of the first mentioned apparatus.
Figure 3:
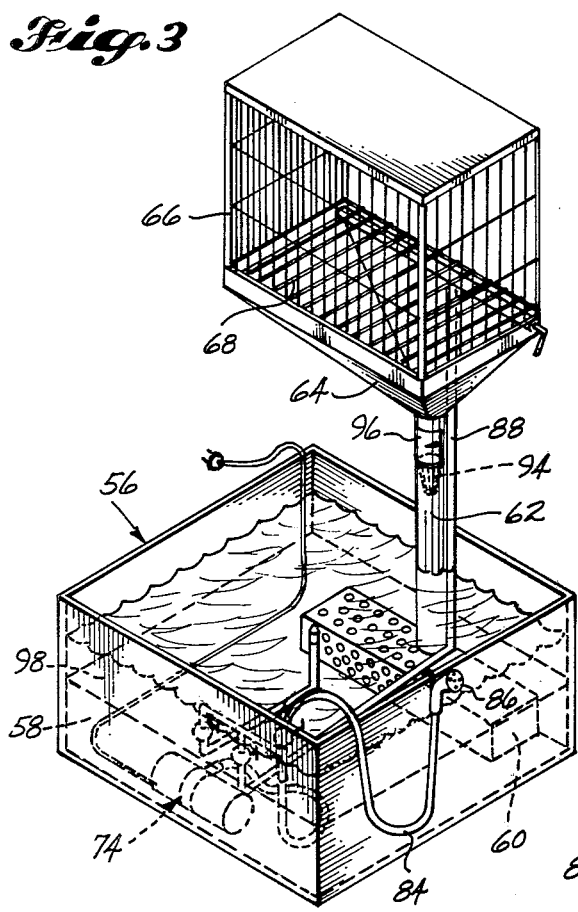
FIG. 3 is a perspective view of the second mentioned apparatus.
Figure 4:
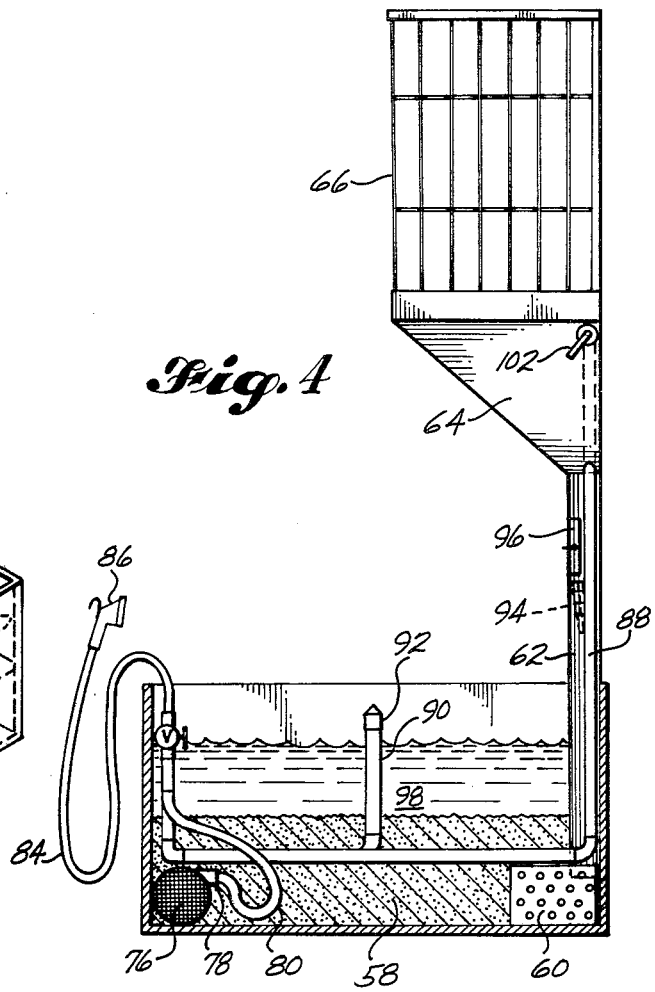
FIG. 4 is a part cross sectional, side elevational view of the second mentioned apparatus.
Figure 5:
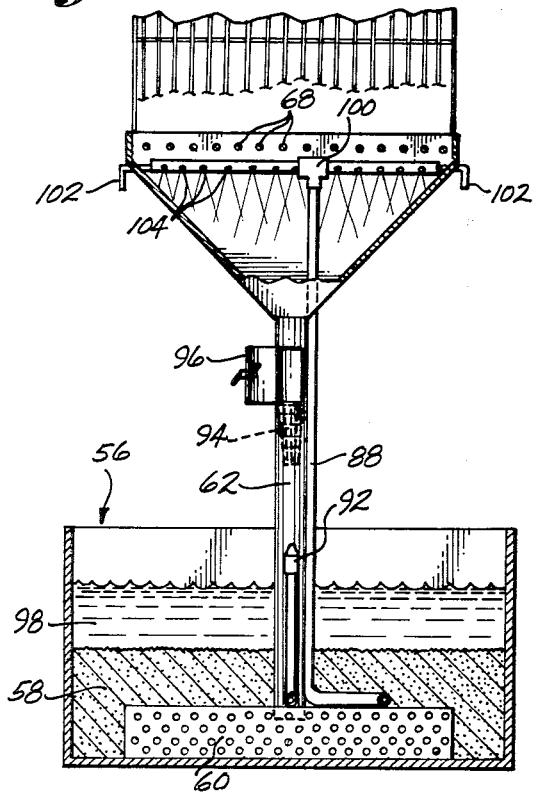
FIG. 5 is a part cross sectional, front elevational view of the same.
Figure 6:
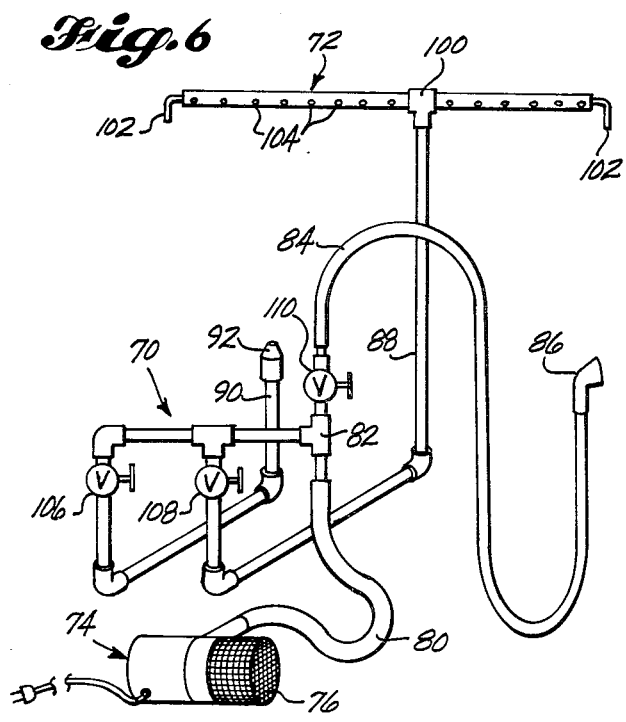
FIG. 6 is a schematic representation of the plumbing employed in the latter apparatus.

Referring to the drawings, it will be seen that the apparatus in FIGS. 1 and 2 comprises a tall four-sided cabinet 2, the upper portion 4 of which is adapted as a bird cage and the lower portion 6 of which is outfitted and adapted to collect and remove the refuse generated when a bird occupies the cage. More specifically, the sides of the upper portion have wire mesh covered openings 8 therein and the space enclosed within the openings has a funnel-shaped sump or trough 10 in the bottom thereof, across the top of which there is a heavier gauge metal grill 12 forming a false bottom for the cage. The trough 10 converges to a tubular drain 14 which in turn has a J-shaped trap 16 coupled to the bottom end portion thereof. Below the trough and partially enclosing the trap is a portable filter unit 16 having an outboard pump 18 thereon. The filter unit 16 rests on the bottom 20 of the cabinet and comprises a box-like casing 22 having a removable top 24 thereon. The top 24 has an opening 26 in the center thereof and the trap is slidably engaged in the opening 26 and adjustably connected with the drain tube 14 so that it can depend inside of the casing at a level dependent on the extent to which it is adjustably raised and lowered on the tube. The filter unit 16 also comprises a perforated plate 28 that is seated inside of the casing above the bottom thereof to form a plenum 30 therebetween. The plate 28 has a bed 32 of sand, charcoal, glass wool or the like resting thereon, the upper surface of which is disposed below the opening 34 of the trap. The plenum 30 has an opening 36 in one end thereof and the inlet 38 of the pump 18 is engaged in the same in a watertight manner to intake liquid from the plenum. The outlet 39 of the pump is oriented upwardly toward the cage and there is a hose or pipe 40 releaseably interengaged with the outlet and extending upwardly to a level abreast of the trough 10, where a right angular extension 42 of the pipe passes through one side of the trough and supports a spray head 44 on the end thereof at the center of the trough. The orifices 46 of the head are oriented generally upwardly to discharge over all surfaces of the trough as illustrated in FIG. 2, and a valve 48 in the pipe controls the flow to the head from the pump, both in terms of opening and closing the pipe to flow and in terms of throttling the flow as needed.

A basket-like screen 50 is removably seated in the drain tube 14 to catch screenable refuse such as feathers, sticks and the like, and there is access to the screen through a small door 52 in the tube 14 whereby the screen 50 can be removed for cleaning. A door 54 in the near side of the cabinet provides access to the door 52. The door 54 also enables the portable filter unit 16 to be inserted and removed for backwashing, as shall be explained.

When a bird occupies the cage, its droppings, feathers and the like fall into the funnel-shaped trough 10, together with other debris such as seeds and the like. To collect and remove the various debris, the filter unit 16 is filled with water or the like to a level between the upper surface of the filter bed 32 and the opening 34 of the trap, and the pump 18 is activated to pump the water in the plenum upwardly through the pipe 40 into the spray head 44, where the water discharges over the surfaces of the trough and washes the debris downwardly through the screen 50 into the trap 16. The water in the trap progressively spills over onto the bed 32 and replenishes the initial charge of water for further cycling of it through the system. Eventually, a bacterial colony develops on the bed to subject the filtered refuse to biological degradation. From time to time, however, the pipe 40 should be disengaged from the outlet 38 of the pump, the trap 16 should be raised, and the filter unit should be withdrawn from the cabinet through the door 54 for backwashing before it is returned to the cabinet for reuse.

Referring now to FIGS. 3–6, it will be seen that the apparatus comprises an open-topped tank 56 having a bed 58 of sand or the like in the bottom thereof. Buried in the sand at one end of the tank is a perforated box 60 which extends crosswise of the end. Upstanding from the box and attached to the end of the tank is a standpipe 62 which communicates with the interior of the box through the top thereof. The standpipe 62 has a funnel-shaped sump or trough 64 at the top thereof and a bird cage 66 rests on the rim of the trough, again with a metal grill 68 in the bottom thereof across the top of the trough.

Also partially buried in the bed 58 of sand is a pump-fed system 70 of pipe which terminates at one end in a spray manifold 72 that is mounted just under the grill 68 at the top of the trough 64 to spray the surfaces of the same. The pump 74 for the system is submersible and is buried in the opposite end of the bed of sand from the box 60. The inlet 76 of the pump is screened and the outlet 78 thereof communicates with the system of pipe through a flexible hose 80 which is coupled to one cross port of a Tee connection 82 in the system. The opposite cross port of the Tee connection 82 has another flexible hose 84 coupled to it with a spray head 86 thereon which can be put to general use in and around the maintenance unit. The center port of the Tee is coupled to two right angular lengths of piping, 88 and 90. One length 88 is buried in the bed of sand and is uprighted in parallel with the standpipe 62 to support the spray manifold 72 in the trough 64. The other length 90 is also buried in the bed of sand and is uprighted centrally of the same to support a fountainhead 92 at the center of the tank.

The standpipe 62 is equipped with a basket-like screen 94 similar to that used in the embodiment of FIGS. 1 and 2, and there is a door 96 in the pipe 62 for access to the screen 94 for cleaning.

When the apparatus is put to use, the tank 56 is charged with water to a level well above the upper surface of the sand bed 58, but slightly below the level of the fountainhead 92. This provides a pool 98 of water in the tank above the bed to support fish and other aquatic life within the tank. The spray manifold 72 is pivotally mounted in a fluid connection 100 at the top of the pipe 88, and is equipped with handles 102 at the outside ends thereof, so that it can be swung through approximately 90° in the trough to enable it to discharge water from the orifices 104 of the same over all surfaces of the trough. The flush water washes down through the standpipe 62 and through the screen 94 into the box 60. When the pump 74 is actuated, the water in the box is drawn horizontally through the sand bed into the inlet 76 of the pump, and then is recycled into the system 70 of pipe for discharge either from the fountainhead 92 or the manifold 72, or from both. The water may also be discharged through the spray head 86, and there are valves 106, 108 and 110 in the system 70 to regulate the flow to each of the heads 92, 72 and 86 from the outlet of the pump.

The pump 74 also intakes water from the pool 98 occupied by the fish and other aquatic life, so that the pool water is also cycled through the bed and included with the water that is returned to the tank through the system of pipe.

As in the case of the first embodiment, a bacterial colony develops on the bed to subject the water born debris to biological degradation. However, the bed normally does not require backwashing when the maintenance unit is operated in a balanced condition using the valves 106, 108 and 110 to regulate the flow for this purpose. It may be that the flow need only be intermittent, or it may be that a continuous flow is necessary or desirable to balance the unit. The balanced condition is also a function of the size of the orifices 104 in the box, and often it is necessary to obtain the balanced condition through empirical procedures, based on the occupancy in the cage and in the pool.

The fountain spray 92 is also an aid in aerating the water, and aids in maintaining plant and other aquatic life in and around the tank. The spray head 86 also is an aid in this connection.

Ordinarily, the tank 56 also serves as a terrarium, but the plant life is omitted for the sake of clarity.

Of course, valve 110 is normally opened only when needed; whereas valves 106 and 108 are normally open continuously to recycle the water at equal pressure.

Turtles, frogs and reptiles may also be included in and around the pool 98 in the tank if desired.

What is claimed is:

1. In combination, a cage having a roof, sides and bottom defining a hollow, air-filled enclosure dimensioned to impound a domesticated bird; said cage being adapted to permit the bird to be viewed from outside the cage while the bird is contained therein, the bottom of the cage being part conical in vertical cross section and having surfaces thereon which slope downwardly toward a point to form a funnel-like sump under the enclosure for the drainage of a liquid therefrom, there being a false bottom disposed in the enclosure above the sump which is apertured to retain the bird above the sump while allowing the waste material generated by the bird's occupancy of the cage to gravitate to the sump, flush means including a nozzle adjacent the false bottom for discharging a liquid onto the surfaces of the sump to collect and entrain portions of the waste material therein for removal from the sump, a filter unit comprising a bed of particle matter which is adapted so that the waste entraining liquid can be passed therethrough while elements of the waste material are filtered therefrom, and which is also adapted to support bacterial life thereon that subjects the waste elements to biological degradation, conduit means connected with the bottom of the sump to convey the waste-entraining liquid to the bed of particle matter, pump means for inducing the waste-entraining liquid to flow through the bed of particle matter between inlet and outlet points on relatively opposite sides thereof and thus generate a filtered effluent, and pump means for returning the filtered effluent to the nozzle for discharge onto the surfaces of the sump to collect and entrain a new portion of the waste material therein for removal from the sump, whereby the sump is continually flushed by the liquid and the liquid is continually renewed as a flush medium by the filter unit.

2. The combination according to claim 1 wherein the flush means is operable to spray the liquid over the bottom of the cage.

3. The combination according to claim 1 wherein pump means are interposed between the outlet point and the nozzle.

4. The combination according to claim 3 wherein the cage is disposed above the bed, the liquid is conveyed to the upper surface of the bed by gravity, and the pump means is operative to withdraw the filtered effluent at a point below said surface and thence to lift the effluent to the nozzle.

5. The combination according to claim 3 wherein the liquid is conveyed to a point on one lateral side of the bed, and the pump means is operable to withdraw the filtered effluent at a point on the opposite lateral side thereof and thence to lift the effluent to the nozzle.

6. The combination according to claim 5 further comprising a container which is adapted to display aquatic life, and wherein the bed of particle matter is held in the container and the liquid is adjusted in volume to form a pool of liquid in the container which is adapted to submerge the bed to a level raised sufficiently above the upper surface of the bed to form an inhabitable body of water for the aquatic life therebetween.

7. The combination according to claim 1 further comprising means for screening the waste entraining liquid from the cage before it flows through the filter unit.

* * * * *